United States Patent
Ranjan et al.

(10) Patent No.: US 10,534,738 B2
(45) Date of Patent: Jan. 14, 2020

(54) HOST BUS ADAPTOR WITH CONFIGURABLE INTERFACE

(71) Applicant: WESTERN DIGITAL TECHNOLOGIES, INC., San Jose, CA (US)

(72) Inventors: Kumar Ranjan, Bangalore (IN); Sunny Koul, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 50 days.

(21) Appl. No.: 15/873,395

(22) Filed: Jan. 17, 2018

(65) Prior Publication Data

US 2019/0220429 A1 Jul. 18, 2019

(51) Int. Cl.
*G06F 12/00* (2006.01)
*G06F 13/00* (2006.01)
*G06F 13/38* (2006.01)
*G06F 13/40* (2006.01)
*H04L 12/54* (2013.01)
*G06F 13/12* (2006.01)

(52) U.S. Cl.
CPC .......... *G06F 13/385* (2013.01); *G06F 13/128* (2013.01); *G06F 13/4027* (2013.01); *G06F 13/4068* (2013.01); *H04L 12/5692* (2013.01)

(58) Field of Classification Search
CPC ............... G06F 13/385; G06F 13/4027; G06F 13/4068; G06F 13/128
See application file for complete search history.

(56) References Cited

U.S. PATENT DOCUMENTS

| | | | |
|---|---|---|---|
| 8,230,153 B2 | 7/2012 | El Zur | |
| 8,631,162 B2 | 1/2014 | Elzur et al. | |
| 9,088,451 B2 | 7/2015 | Elzur et al. | |
| 9,424,224 B2 | 8/2016 | Voorhess et al. | |
| 9,460,040 B2 | 10/2016 | Veal et al. | |
| 2010/0077117 A1* | 3/2010 | Asnaashari | G06F 13/385 710/74 |
| 2011/0058573 A1* | 3/2011 | Balakavi | H04L 49/602 370/463 |
| 2012/0278551 A1 | 11/2012 | Chakhaiyar et al. | |
| 2014/0129737 A1 | 5/2014 | Elzur et al. | |
| 2014/0129753 A1* | 5/2014 | Schuette | G06F 13/4068 710/301 |

(Continued)

OTHER PUBLICATIONS

Broadcom, Broadcom Delivers the Industry's First NV/Me/SAS/SATA Storage Controllers and NVMe Switch Management Software, Feb. 23, 2016, 3 pages.

(Continued)

*Primary Examiner* — Sean D Rossiter
(74) *Attorney, Agent, or Firm* — Vierra Magen Marcus LLP

(57) ABSTRACT

A system includes a host interface, a storage interface, and one or more control circuits coupled to the host interface and coupled to the storage interface. The one or more control circuits include a common set of registers configured to maintain first entries according to a first storage protocol for first storage devices connected to the storage interface and to maintain second entries according to a second storage protocol for second storage devices connected to the storage interface.

20 Claims, 13 Drawing Sheets

(56) References Cited

U.S. PATENT DOCUMENTS

| | | | | |
|---|---|---|---|---|
| 2015/0006663 A1* | 1/2015 | Huang | ............... | G06F 13/4221 |
| | | | | 709/213 |
| 2016/0328347 A1* | 11/2016 | Worley | ............... | G06F 13/385 |
| 2017/0010995 A1* | 1/2017 | Robinson | ............ | G06F 13/4022 |
| 2017/0019859 A1* | 1/2017 | Yu | .................... | H04W 52/0261 |
| 2017/0300445 A1* | 10/2017 | McKnight | ........... | G06F 13/4027 |
| 2018/0032471 A1* | 2/2018 | Olarig | ............... | G06F 13/4022 |
| 2018/0260125 A1* | 9/2018 | Botes | ................... | G06F 3/0617 |
| 2019/0042742 A1* | 2/2019 | Matthews | ............. | G06F 21/556 |

OTHER PUBLICATIONS

Broadcom, Product Brief, 9400 Series Tri-Mode Storage HBAs, 2017, 2 pages.
Broadcom, Product Brief, SASB416 Tri-Mode IOC, 2016, 3 pages.
Broadcom, Selection Guide, Storage Solutions, 2017, 10 pages.
NVM Express, Revision 1.3, May 1, 2017, 282 pages.

* cited by examiner

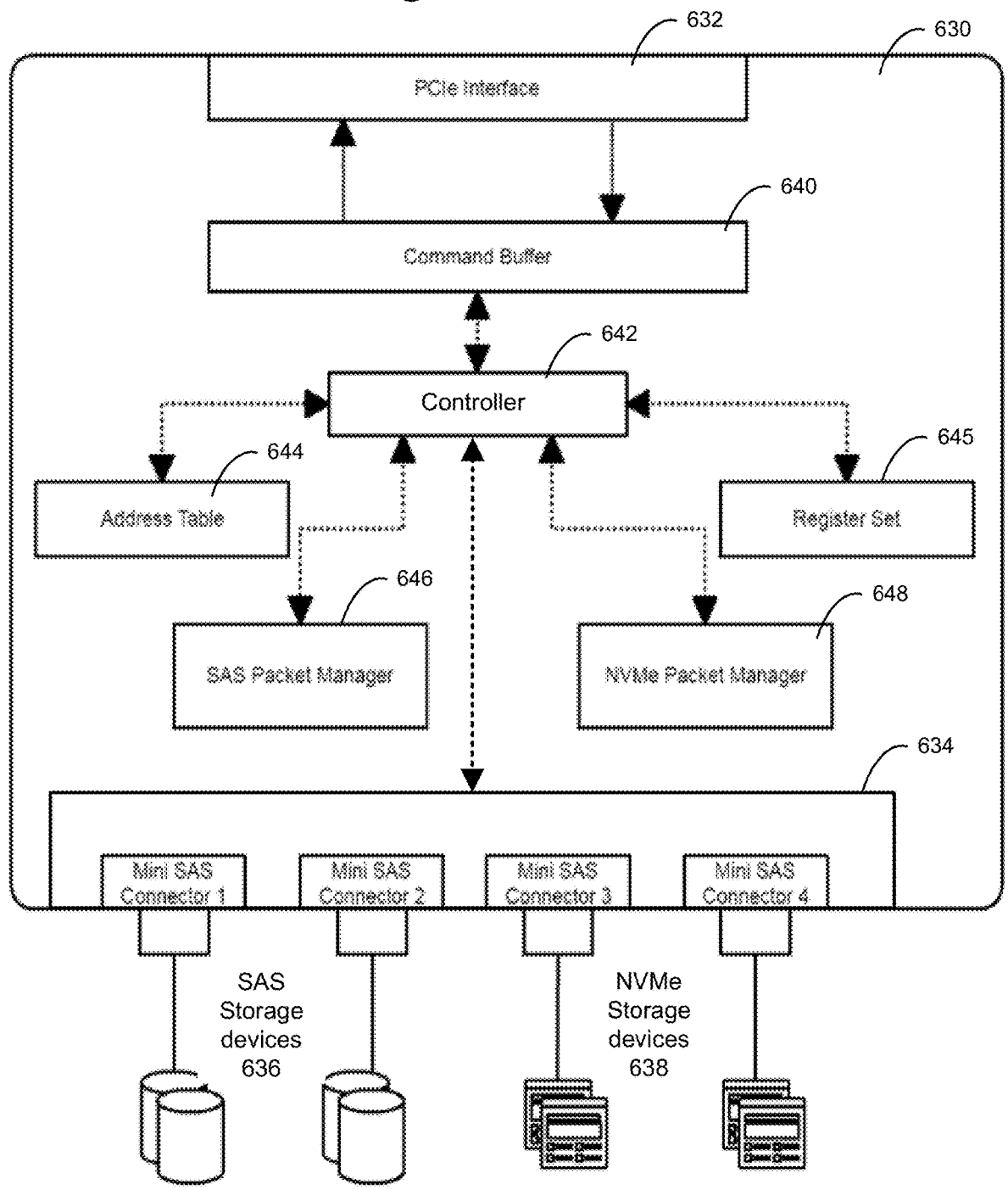

| LUN ID | Address | Port | |
|---|---|---|---|
| 0 | 0x5000ccab0205413f | 17 | SAS |
| 4 | 0x5000cca23b04d141 | 8 | |
| 1 | 0x5000cca23b04d0de | 11 | |
| 2 | /devices/pci0000:00/0000:00:02.0/0000: 07:00.0/0000:08:00.0/0000:0c:00.0/pcifa b_bus/pcifab- 0/00:0016/nvme/nvme0/nvme0n1 | 3 | NVMe |
| 5 | /devices/pci0000:00/0000:00:02.0/0000: 07:00.0/0000:08:01.0/0000:0b:00.0/pcifa b_bus/pcifab- 1/01:0016/nvme/nvme1/nvme1n1 | 6 | |
| 3 | Expander Address | 14 | |

US 10,534,738 B2

HOST BUS ADAPTOR WITH CONFIGURABLE INTERFACE

BACKGROUND

Semiconductor memory is widely used in various electronic devices such as cellular telephones, digital cameras, personal digital assistants, medical electronics, mobile computing devices, and non-mobile computing devices. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory) and Electrically Erasable Programmable Read-Only Memory (EEPROM).

A data storage device that includes semiconductor memory may be in communication with a host system through an interface. In some cases, more than one data storage device may be in communication with a host system through one or more interfaces. Various standardized interfaces may be used for communication between components including data storage devices and a host system, including Peripheral Component Interface (PCI), PCI express (PCIe), Serial ATA (SATA), Serial Attached SCSI (SAS), Non-Volatile Memory Host Controller Interface Specification (NVMHCIS) or NVM Express (NVMe), and other interfaces. In some cases, devices such as expanders, switches, and/or Host Bus Adapters (HBAs) may be inserted between a host system and one or more data storage devices.

BRIEF DESCRIPTION OF THE DRAWINGS

Like-numbered elements refer to common components in the different figures.

FIG. 6 illustrates an example configuration of some components of an HBA.

DETAILED DESCRIPTION

In some examples, a Host Bus Adapter (HBA) may be connected between a host and one or more data storage devices. An HBA may allow some flexibility in configuration of data storage devices. In some examples, a single HBA may allow different types of data storage devices to be connected to a host without occupying multiple slots. In general, a host system has a finite number of such slots (i.e. a finite number of physical connectors with space available for a module such as a storage device). Thus, for example, an HBA occupying a single PCIe slot (single PCIe connector and space adjacent to the connector) in a server may connect data storage devices of different types including, for example, one or more SAS storage devices and one or more NVMe storage devices. In general, NVMe storage devices contain non-volatile memory such as illustrated, for example, in FIG. 4, and the NVMe protocol is a protocol adapted for accessing such storage devices. In contrast, SAS storage devices may include Hard Disk Drives (HDDs) and the SAS protocol is a protocol adapted for accessing such storage devices. By facilitating connection of both types of storage devices, a system may efficiently communicate with a range of different hardware including both older and newer components. An HBA may maintain a common address table that records addresses of connected data storage devices including both SAS and NVMe storage devices. The common address table may be updated when storage devices are added or removed. A common register set in an HBA may include entries for both SAS storage devices and NVMe storage devices. Entries in such a common register set may be replicated in a common address space in host memory. Execution of both SAS and NVMe commands may use these common structures.

Figure 1:
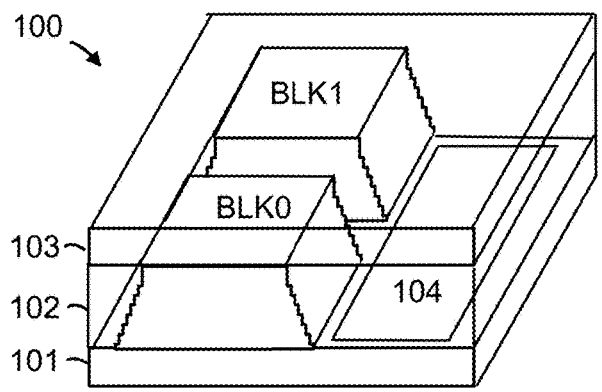
FIG. 1 is a perspective view of a 3D stacked non-volatile memory device.

FIGS. 1-4 describe one example of a memory system that can be used to implement the technology proposed herein. FIG. 1 is a perspective view of a three-dimensional (3D) stacked non-volatile memory device. The memory device 100 includes a substrate 101. On and above the substrate are example blocks of memory cells, including BLK0 and BLK1, formed of memory cells (non-volatile storage elements). Also on substrate 101 is peripheral area 104 with support circuits for use by the blocks. Substrate 101 can also carry circuits under the blocks, along with one or more lower metal layers which are patterned in conductive paths to carry signals of the circuits. The blocks are formed in an intermediate region 102 of the memory device. In an upper region 103 of the memory device, one or more upper metal layers are patterned in conductive paths to carry signals of the circuits. Each block of memory cells comprises a stacked area of memory cells, where alternating levels of the stack represent word lines. While two blocks are depicted as an example, additional blocks can be used, extending in the x- and/or y-directions.

In one example implementation, the length of the plane in the x-direction, represents a direction in which signal paths for word lines extend (a word line or SGD line direction), and the width of the plane in the y-direction, represents a direction in which signal paths for bit lines extend (a bit line direction). The z-direction represents a height of the memory device.

Figure 2:
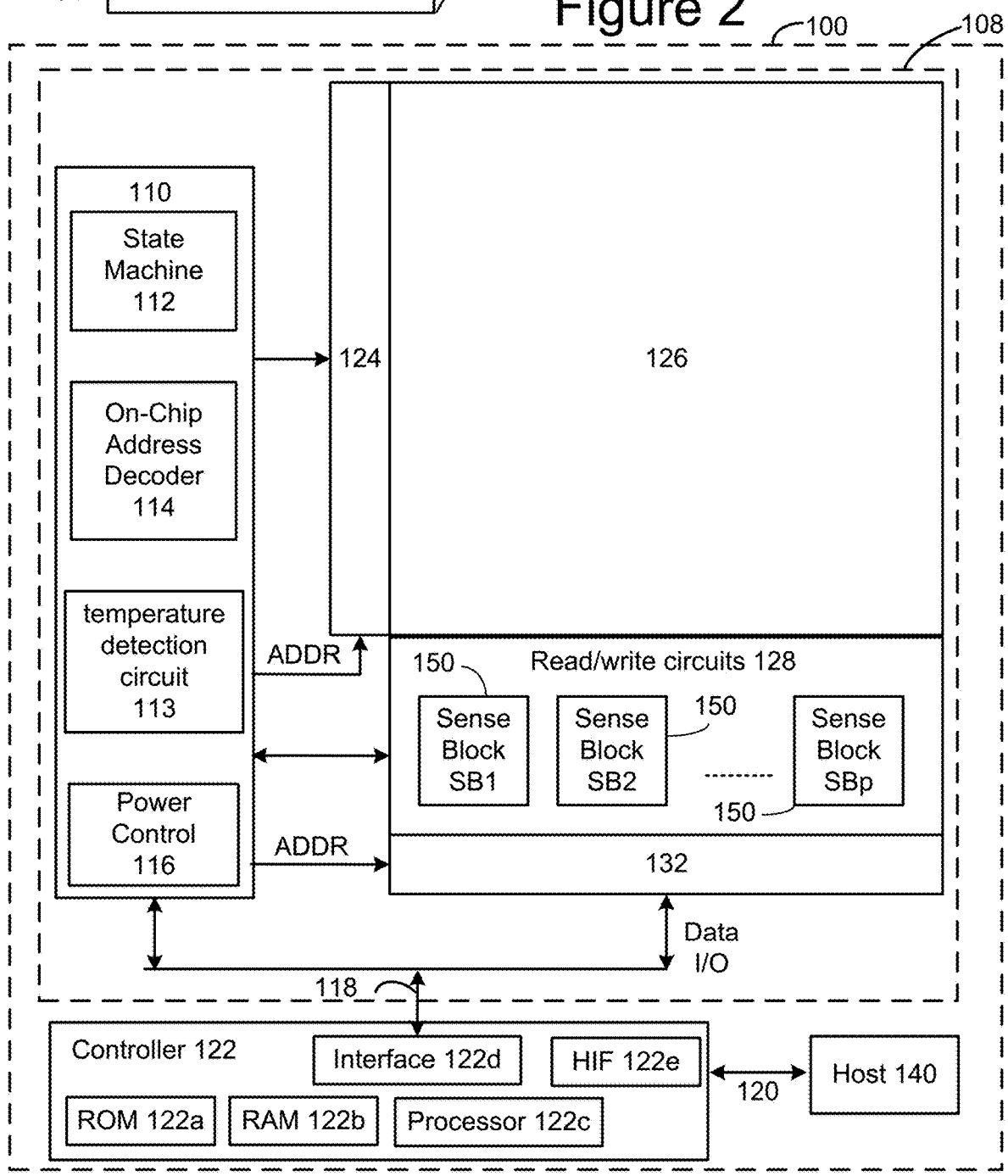
FIG. 2 is a functional block diagram of a memory device such as the 3D stacked non-volatile memory device 100 of FIG. 1.

FIG. 2 is a functional block diagram of an example memory device such as the 3D stacked non-volatile memory device 100 of FIG. 1. The components depicted in FIG. 2 are electrical circuits. Memory device 100 includes one or more memory die 108. Each memory die 108 includes a three-dimensional memory structure 126 of memory cells (such as, for example, a 3D array of memory cells), control circuitry 110, and read/write circuits 128. In other embodiments, a two-dimensional array of memory cells can be used. Memory structure 126 is addressable by word lines via a decoder 124 (row decoder) and by bit lines via a column decoder 132. The read/write circuits 128 include multiple sense blocks 150 including SB1, SB2, . . . , SBp (sensing circuitry) and allow a page of memory cells to be read or programmed in parallel. In some systems, a Controller 122 is included in the same memory device, such as memory device 100 (e.g., a removable storage card) as the one or more memory die 108. However, in other systems, the Controller can be separated from the memory die 108. In some embodiments, the Controller will be on a different die than the memory die. In some embodiments, one Controller 122 will communicate with multiple memory die 108. In other embodiments, each memory die 108 has its own Controller. Commands and data are transferred between the host 140 and Controller 122 via a data bus 120, and between Controller 122 and the one or more memory die 108 via lines 118. In one embodiment, memory die 108 includes a set of input and/or output (I/O) pins that connect to lines 118.

Memory structure 126 may comprise one or more arrays of memory cells including a 3D array. The memory structure may comprise a monolithic three-dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides chip-level control of memory operations. Temperature detection circuit 113 is configured to detect temperature, and can be any suitable temperature detection circuit known in the art. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters.

The on-chip address decoder 114 provides an address interface between addresses used by host 140 or Controller 122 to the hardware address used by the decoders 124 and 132. Power control module 116 controls the power and voltages supplied to the word lines and bit lines during memory operations. It can include drivers for word line layers (discussed below) in a 3D configuration, select transistors (e.g., SGS and SGD transistors, described below) and source lines. Power control module 116 may include charge pumps for creating voltages. The sense blocks include bit line drivers. An SGS transistor is a select gate transistor at a source end of a NAND string, and an SGD transistor is a select gate transistor at a drain end of a NAND string.

Any one or any combination of control circuitry 110, state machine 112, decoders 114/124/132, temperature detection circuit 113, power control module 116, sense blocks 150, read/write circuits 128, and Controller 122 can be considered a circuit or circuits (or a managing circuit) that performs the functions described herein.

Controller 122 (which in one embodiment is an electrical circuit that may be on-chip or off-chip) may comprise one or more processors 122c, ROM 122a, RAM 122b, Memory interface 122d and Host Interface 122e, all of which are interconnected. One or more processors 122C is one example of a control circuit. Other embodiments can use state machines or other custom circuits designed to perform one or more functions. The storage devices (including ROM 122a, RAM 122b) comprises code such as a set of instructions, and the processor 122c is operable to execute the set of instructions to provide the functionality described herein. Alternatively, or additionally, processor 122c can access code from a storage device in the memory structure, such as a reserved area of memory cells connected to one or more word lines. Memory interface 122d, in communication with ROM 122a, RAM 122b and processor 122c, is an electrical circuit that provides an electrical interface between Controller 122 and memory die 108. For example, memory interface 122d can change the format or timing of signals, provide a buffer, isolate from surges, latch I/O, etc. Processor 122C can issue commands to control circuitry 110 (or any other component of memory die 108) via Memory interface 122d. Host Interface 122e in communication with ROM 122a, RAM 122b and processor 122c, is an electrical circuit that provides an electrical interface between Controller 122 and host 140. For example, Host Interface 122e can change the format or timing of signals, provide a buffer, isolate from surges, latch I/O, etc. Commands and data from host 140 are received by Controller 122 via Host Interface 122e. Data sent to host 140 are transmitted via Host Interface 122e.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors.

A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

A three-dimensional memory array is arranged so that memory cells occupy multiple planes or multiple memory device levels, thereby forming a structure in three dimensions (i.e., in the x, y and z directions, where the z direction is substantially perpendicular, and the x and y directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in they direction) with each column having multiple memory cells. The vertical columns may be arranged in a two-dimensional configuration, e.g., in an x-y plane, resulting in a three-dimensional arrangement of memory cells, with memory cells on multiple vertically stacked memory planes. Other configurations of memory elements in three dimensions can also constitute a three-dimensional memory array.

By way of non-limiting example, in a three-dimensional NAND memory array, the memory elements may be coupled together to form vertical NAND strings that traverse across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
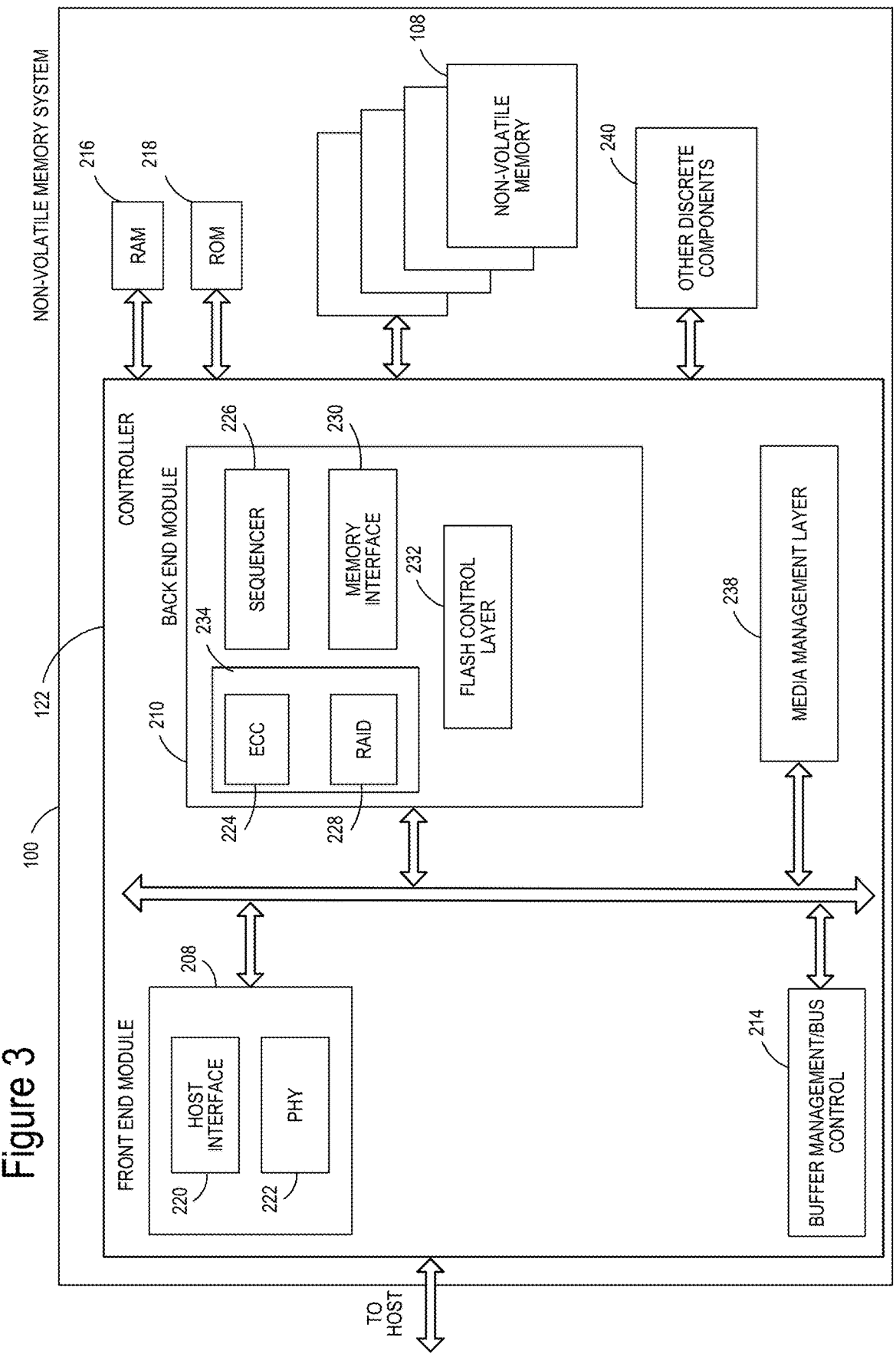
FIG. 3 is a block diagram depicting one embodiment of a Controller.

FIG. 3 is a block diagram of memory system 100, depicting more details of Controller 122. In one embodiment, the system of FIG. 3 is a solid-state drive (SSD). As used herein, a flash memory Controller is a device that manages data stored on flash memory and communicates with a host, such as a computer or electronic device. A flash memory Controller can have various functionality in addition to the specific functionality described herein. For example, the flash memory Controller can format the flash memory to ensure the memory is operating properly, map out bad flash memory cells, and allocate spare memory cells to be substituted for future failed memory cells. Some part of the spare memory cells can be used to hold firmware to operate the flash memory Controller and implement other features. In operation, when a host needs to read data from or write data to the flash memory, it will communicate with the flash memory Controller. If the host provides a logical address to which data is to be read/written, the flash memory Controller can convert the logical address received from the host to a physical address in the flash memory. (Alternatively, the host can provide the physical address). The flash memory Controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The communication interface between Controller 122 and non-volatile memory die 108 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system. For example, the flash memory may be embedded within the host, such as in the form of a solid-state disk (SSD) drive installed in a personal computer.

In some embodiments, memory system 100 includes a single channel between Controller 122 and non-volatile memory die 108, the subject matter described herein is not limited to having a single memory channel. For example, in some memory system architectures, 2, 4, 8 or more channels may exist between the Controller and the memory die, depending on Controller capabilities. In any of the embodiments described herein, more than a single channel may exist between the Controller and the memory die, even if a single channel is shown in the drawings.

As depicted in FIG. 3, Controller 122 includes a front-end module 208 that interfaces with a host, a back-end module 210 that interfaces with the one or more non-volatile memory die 108, and various other modules that perform functions which will now be described in detail.

The components of Controller 122 depicted in FIG. 3 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include or comprise software stored in a processor readable device (e.g., memory) to program one or more processors for Controller 122 to perform the functions described herein. The architecture depicted in FIG. 3 is one example implementation that may (or may not) use the components of Controller 122 depicted in FIG. 2 (i.e. RAM, ROM, processor, interface).

Referring again to modules of the Controller 122, a buffer manager/bus Controller 214 manages buffers in random access memory (RAM) 216 and controls the internal bus arbitration of Controller 122. A read only memory (ROM) 218 stores system boot code. Although illustrated in FIG. 3 as located separately from the Controller 122, in other embodiments one or both of the RAM 216 and ROM 218 may be located within the Controller. In yet other embodiments, portions of RAM and ROM may be located both within the Controller 122 and outside the Controller. Further, in some implementations, the Controller 122, RAM 216, and ROM 218 may be located on separate semiconductor die.

Front-end module 208 includes a host interface 220 and a physical layer interface 222 (PHY) that provide the electrical interface with the host or next level storage Controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 may be a communication interface that facilitates transfer for data, control signals, and timing signals.

Back-end module 210 includes an error correction Controller (ECC) engine, ECC engine 224, that encodes the data bytes received from the host, and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. ECC engine 224 and RAID module 228 both calculate redundant data that can be used to recover when errors occur and may be considered examples of redundancy encoders. Together, ECC engine 224 and RAID module 228 may be considered to form a combined redundancy encoder 234. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back-end module 210.

Additional components of memory system 100 illustrated in FIG. 3 include media management layer 238, which performs wear leveling of memory cells of non-volatile memory die 108. Memory system 100 also includes other discrete components 240, such as external electrical interfaces, external RAM, resistors, capacitors, or other components that may interface with Controller 122. In alternative embodiments, one or more of the physical layer interface 222, RAID module 228, media management layer 238 and buffer management/bus Controller 214 are optional components that are not necessary in the Controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the flash memory structure 126 of memory die 108. The MML 238 may be needed because: 1) the flash memory may have limited endurance; 2) the flash memory structure 126 may only be written in multiples of pages; and/or 3) the flash memory structure 126 may not be written unless it is erased as a block (i.e. a block may be considered to be a minimum unit of erase and such a non-volatile memory may be considered a block-erasable non-volatile memory). The MML 238 understands these potential limitations of the flash memory structure 126 which may not be visible to the host. Accordingly, the MML 238 attempts to translate the writes from host into writes into the flash memory structure 126.

Controller 122 may interface with one or more memory die 108. In one embodiment, Controller 122 and multiple memory dies (together comprising memory system 100) implement a solid-state drive (SSD), which can emulate, replace or be used instead of a hard disk drive inside a host, as a NAS device, etc. Additionally, the SSD need not be made to work as a hard drive.

Figure 4:
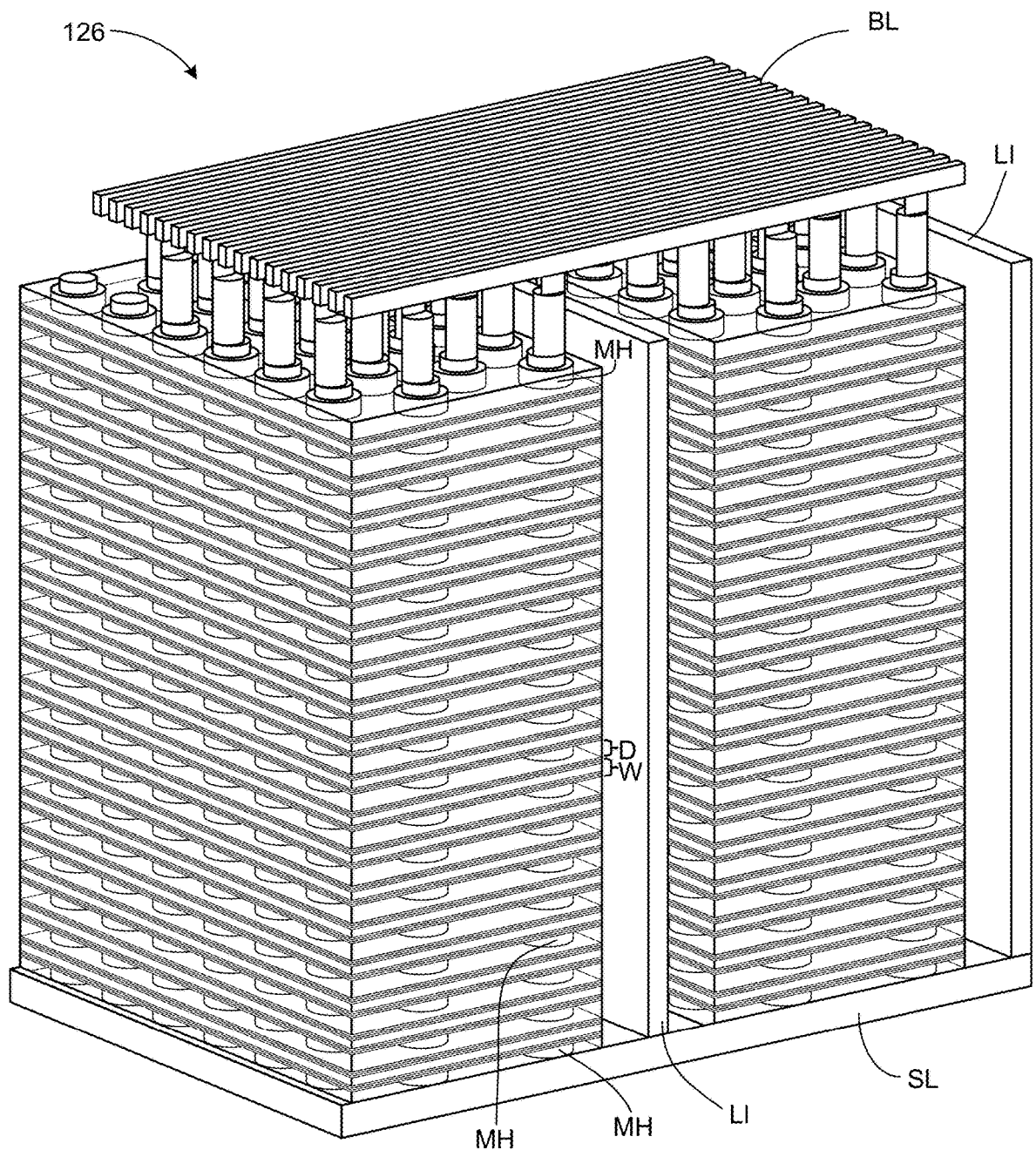
FIG. 4 is a perspective view of a portion of one embodiment of a three-dimensional monolithic memory structure.

FIG. 4 is a perspective view of a portion of a three-dimensional memory structure 126, which includes a plurality memory cells. For example, FIG. 4 shows a portion of one block of memory. The structure depicted includes a set of bit lines BL positioned above a stack of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-216 alternating dielectric layers and conductive layers, for example, 96 data word line layers, 8 select layers, 4 dummy word line layers and 108 dielectric layers. More or less than 108-216 layers can also be used. As will be explained below, the alternating dielectric layers and conductive layers are divided into four "fingers" by local interconnects LI. FIG. 4 only shows two fingers and two local interconnects LI. Below and the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data.

Although the example memory system of FIG. 4 is a three-dimensional memory structure that includes vertical NAND strings with charge-trapping material, other (2D and 3D) memory structures can also be used with the technology described herein. For example, floating gate memories (e.g., NAND-type and NOR-type flash memory ReRAM memories, magnetoresistive memory (e.g., MRAM), and phase change memory (e.g., PCRAM) can also be used.

One example of a ReRAM memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming a non-volatile storage system, each memory cell lies between a pair of write lines arranged at right angles to each other, parallel to the memory cell, one above and one below the memory cell. When current is passed through them, an induced magnetic field is created.

Phase change memory (PCRAM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse but includes a (continuous or non-continuous) vibration or burst of sound, current, voltage light, or other wave.

In some applications, a non-volatile memory may be provided in a data storage device (such as non-volatile memory device 100 of FIG. 3), which may be attached to a host through an interface. Some host systems use a PCI interface, for example, to connect with various devices, including data storage devices, network devices, and other devices. For example, a host may be a server that has several PCI slots to allow connection of peripheral devices. Efficiently using the available slots of a server may provide certain benefits.

In some examples, a Host Bus Adapter (HBA) may be connected between a host and one or more devices connected to the host. A host bus adapter (HBA) is a circuit board and/or integrated circuit adapter that provides input/output (I/O) processing and physical connectivity between a host system, or server, and one or more data storage and/or network devices. Because an HBA typically relieves the host microprocessor of both data storage and retrieval tasks, it can improve the server's performance time. HBAs may be defined by characteristics including their interconnect technology, speed, port count, and system interface. An HBA may be referred to as an HBA card. While some HBAs plug into the PCI or PCI Express (PCIe) slots of a server, other HBA form factors include mezzanine cards for blade servers and aspects of the present technology are not limited to PCI or PCIe form factor or other characteristics.

In some cases, an HBA may communicate with a data storage device using a protocol that is different than the protocol used to communicate with a host so that an HBA may act as an intermediary between two protocols. For example, an HBA may communicate with a data storage device using a protocol that is suitable for use with data storage devices such as Serial Attached SCSI (SAS) protocol, Non-Volatile Memory express (NVMe) protocol, Serial ATA (SATA), or some other suitable protocol. Thus, by using an appropriate HBA, a server or other host may use storage devices that are configured to use different storage protocols. This provides interoperability that may provide flexibility and may allow a range of storage hardware configurations.

SAS may be considered a point-to-point serial protocol that moves data to and from data storage devices such as non-volatile memory storage device 100. SAS generally uses the standard SCSI (Small Computer System Interface) command set. SAS may offer compatibility with some Serial ATA (SATA) versions. SAS is generally defined by specifications generated by the International Committee for Information Technology Standards (INCITS), for example, the SCSI-4 standard.

NVM Express (NVMe) or Non-Volatile Memory Host Controller Interface Specification (NVMHCIS) is a protocol adapted for accessing data storage devices attached via a PCI or PCI Express (PCIe) bus and has some advantages over other protocols such as SCSI, SAS, or SATA, that were developed for Hard Disk Drives (HDDs). NVMe is generally defined by specifications generated by industry participants, for example, NVM_Express_Revision_1.3, published on May 1, 2017.

Figure 5A:
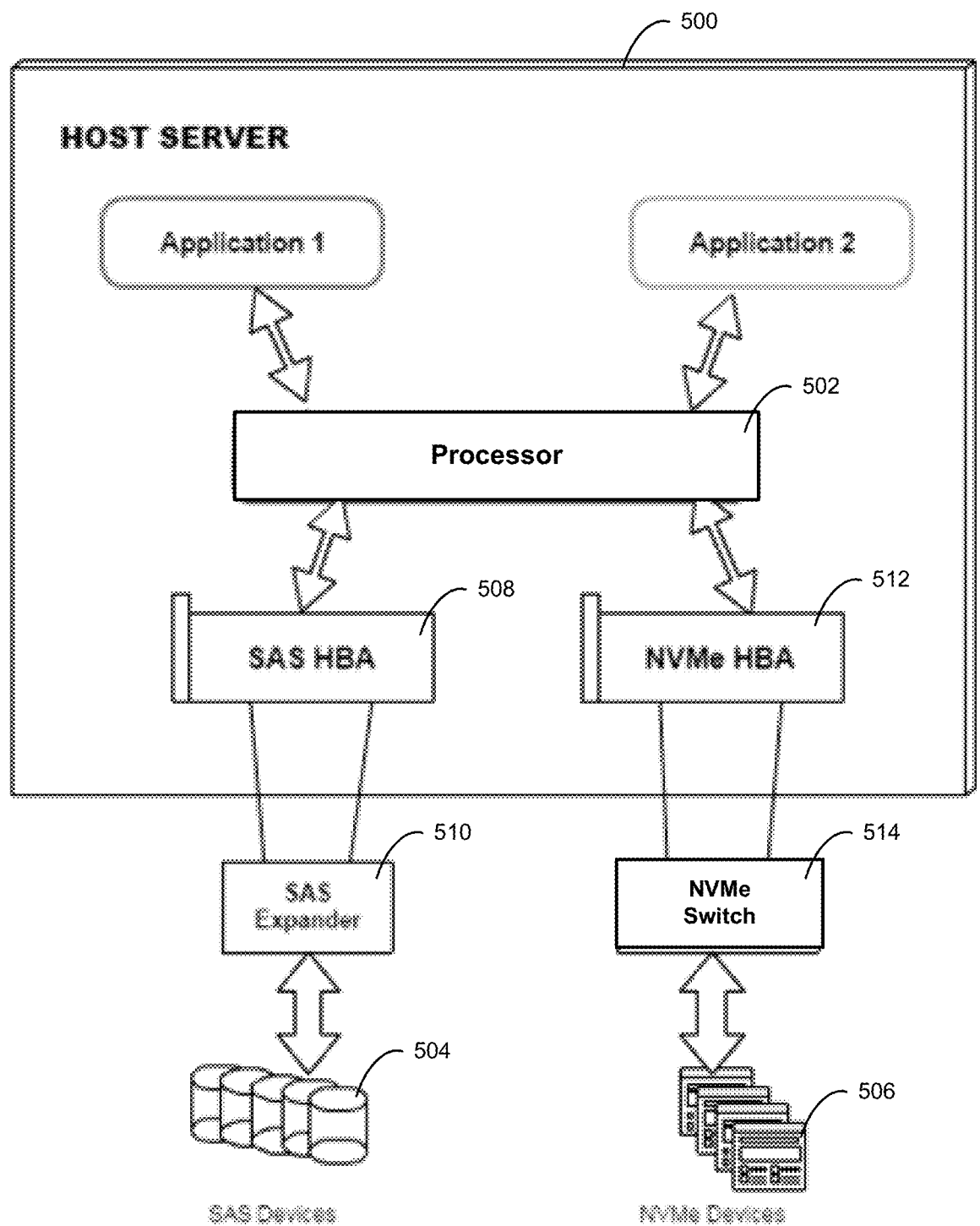
FIG. 5A illustrates a host server with a SAS HBA and an NVMe HBA.

FIG. 5A illustrates an example of a host server 500 that includes a processor 502 (which may also be referred to as a "microprocessor"). Processor 502 runs two applications, Application 1 and Application 2, that access data stored in data storage devices including SAS devices 504 and NVMe devices 506. SAS devices 504 and NVMe devices 506 may include individual data storage devices that have non-volatile memory dies as illustrated in FIG. 4 connected to a controller, such as previously shown in FIGS. 1-3. Access to SAS devices 504 is through a SAS HBA 508 and a SAS expander 510. Access to NVMe devices 506 is through NVMe HBA 512 and NVMe switch 514. SAS HBA 508 and NVMe HBA 512 may physically connect to processor 502 via PCI slots in host server 500 and may communicate with processor 502 using a PCI protocol (e.g. PCIe).

As shown in FIG. 5A, SAS storage devices may connect to a host system through a SAS HBA that includes one or more ports to allow SAS storage devices to be connected. One or more SAS expanders (such as SAS expander 510) allow multiple SAS storage devices to connect to an individual SAS HBA port. Similarly, NVMe storage devices may connect to a host system through a NVMe HBA that includes one or more ports to allow NVMe storage devices to be connected, with one or more NVMe switches (such as NVMe switch 514) allowing multiple NVMe storage devices to connect to an individual NVMe HBA port. The arrangement shown in FIG. 5 requires two HBAs, each occupying a separate slot in a host server (e.g. a PCI, or PCIe slot). Such an arrangement may inefficiently use available slots in a host server and may limit flexibility. For example, a SAS HBA may have spare capacity (e.g. unused ports) while an NVMe HBA may be at capacity so that additional NVMe storage devices cannot be added to the system even though there are ports available (i.e. the available ports are exclusively SAS ports and are not available for NVMe storage devices).

Figure 5B:
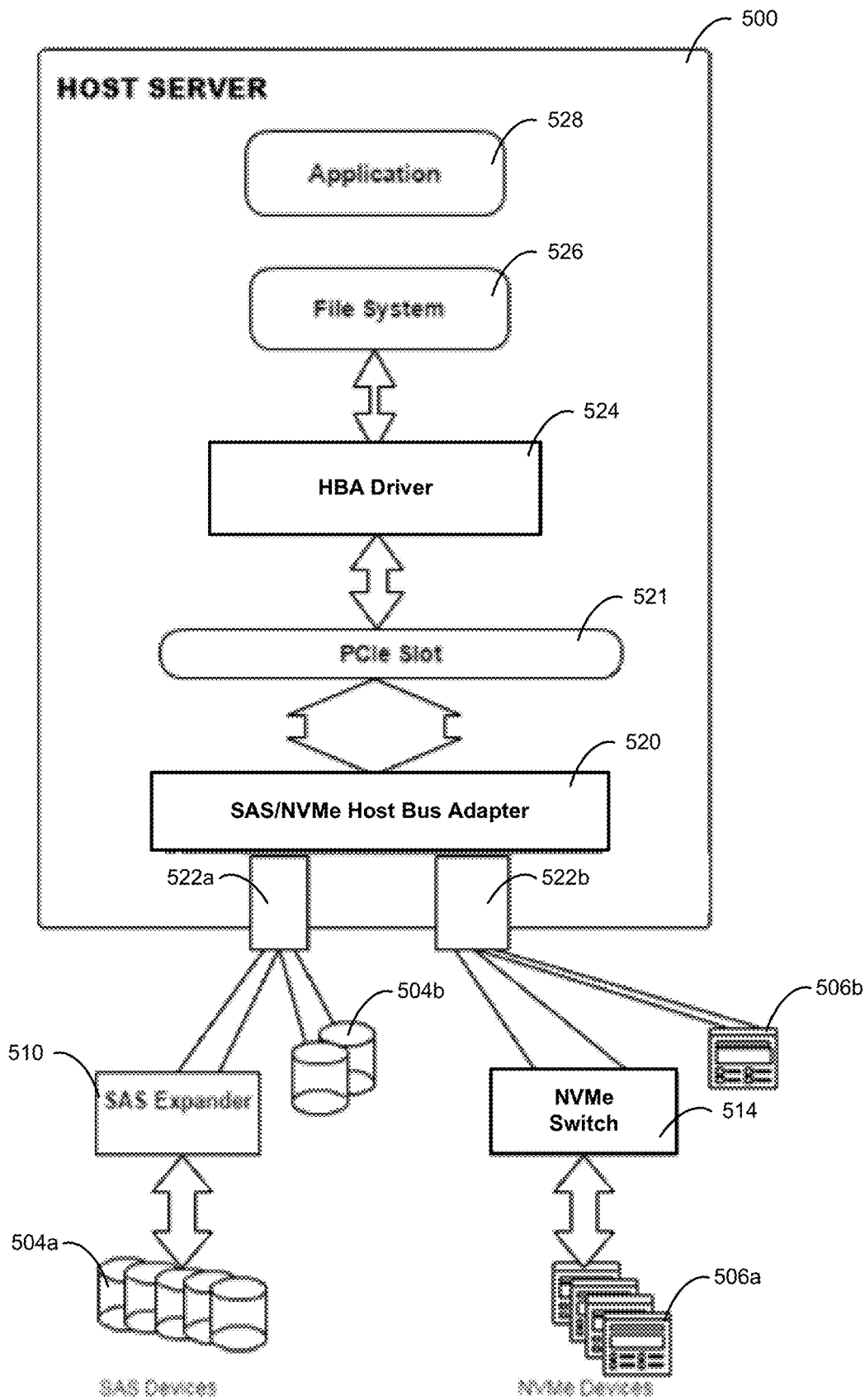
FIG. 5B illustrates a host server with a SAS/NVMe HBA.

In contrast to the arrangement shown in FIG. 5A, FIG. 5B shows host server 500 reconfigured with a single SAS/NVMe HBA 520 occupying a single PCIe slot 521 instead of separate SAS and NVMe HBAs (it will be understood that host server 500 has additional PCI slots that may be occupied by additional HBAs including SAS, NVMe, and SAS/NVMe HBAs). SAS/NVMe HBA 520 is illustrated with two SAS/NVMe ports 522a, 522b, which are each configurable to communicate with either SAS storage devices or NVMe devices (and may be configurable for other protocols too, e.g. SATA). For example, SAS/NVMe ports 522a, 522b may be SFF-8545 ports, or similar ports that are configurable for both SAS and NVMe communication. SAS/NVMe port 522a is shown configured for SAS communication with SAS expander 510 and, through SAS expander 510, with SAS storage devices such as SAS storage devices 504a. SAS/NVMe port 522a also communicates directly with SAS storage devices 504b (i.e. there is a direct physical connection between SAS storage devices 504b and SAS/NVMe port 522a). SAS/NVMe port 522b is shown configured for NVMe communication with NVMe devices such as NVMe devices 506a through NVMe switch 514. SAS/NVMe port 522b also communicates directly with NVMe storage devices 506b (i.e. there is a direct physical connection between NVMe storage devices 506b and SAS/NVMe port 522b). SAS devices 504a-b and NVMe devices 506a-b may include individual data storage devices that have non-volatile memory dies as illustrated in FIG. 4 connected to one or more controllers, such as previously shown in FIGS. 1-3. Each of SAS/NVMe ports 522a, 522b is configurable in at least two configurations, as a SAS port or as a NVMe port. Thus, the configurations of FIG. 5B may be reversed and SAS/NVMe port 522a may be configured for NVMe communication while SAS/NVMe port 522b may be configured for SAS communication, or both ports may be configured for the same protocol (e.g. both SAS or both NVMe). While only two ports are shown in FIG. 5B, it will be understood that an HBA may have more than two ports and that some or all such ports may support multiple protocols. Thus, using a SAS/NVMe HBA such as SAS/NVMe HBA 520 with configurable SAS/NVMe ports may provide a range of configuration options ranging from configuring all ports for SAS to configuring all ports for NVMe, with a range of different mixed SAS/NVMe configurations in between. This gives the option of connecting both SAS storage devices and/or NVMe storage devices while occupying only one PCIe slot in a host server, thus leaving additional PCIe slots available for other purposes.

Host server 500 includes an HBA driver 524 that is configured to interface with SAS/NVMe HBA 520 through PCIe slot 521 on one side and with file system 526 and applications such as application 528 on the other side. Thus, applications that access data storage devices including SAS devices 504a-b and NVMe devices 506a-b can do so through a single HBA driver rather than through multiple drivers.

FIG. 6 shows an example of components of a HBA 630 (e.g. SAS/NVMe HBA 520 of FIG. 5). HBA 630 includes a host interface 632 (a PCIe interface in this example) and a storage interface 634. Storage interface 634 includes four SAS/NVMe ports (Mini SAS Connector 1 to 4) which are individually configurable for use with SAS storage devices and for use with NVMe storage devices (e.g. a SFF-8545 port that is configurable for either SAS or NVMe communication). Storage interface 634, or one or more of Mini SAS connectors of storage interface 634 may be considered a means for communicating with a plurality of storage devices including Storage Attached SCSI (SAS) devices and Non-Volatile Memory Express (NVMe) devices. Two ports, Mini SAS Connector 1 and 2, are connected to SAS storage devices 636 while two other ports, Mini SAS Connector 3 and 4, are connected to NVMe storage devices 638. Control circuits including controller 642 are provided in HBA 630 and are coupled to both the host interface 632 and to the storage interface 634. A command buffer 640 is coupled to host interface 632 so that commands received from a host through host interface 632 may be buffered in HBA 630. Commands may then be operated on and executed in order in which they are received, e.g. controller 642, which may be configured for communication with a host through host interface 632, may access commands in command buffer 640. Host interface 632 (e.g. a PCIe interface circuit) may be considered a means for communicating with a host system. Commands directed to SAS storage devices 636 and commands directed to NVMe storage devices 638 may be identified by controller 642 (e.g. controller 642 may be configured by firmware, or otherwise, to perform identification) according to an address table 644.

Address table 644 is a common address table that includes entries for SAS storage devices 636 and entries for NVMe storage devices 638. Address table 644 may be updated as devices are changed. Thus, if SAS storage devices were disconnected from Mini SAS connector 2 and replaced with NVMe storage devices then address table 644 would be updated to reflect this change. Address table 644 may be initialized according to results of a scan to determine what hardware is connected to each port of storage interface 634, e.g. whether a device connected to a particular port is a SAS storage device or a NVMe storage device. Address table 644 may be stored in a memory such as a RAM, which may be considered an example of a means for storing an address table that includes SAS entries for SAS storage devices and NVMe entries for NVMe devices.

Commands from a host are executed using a register set 645 that is a common register set for both SAS storage devices 636 and NVMe storage devices 638 and includes entries for both SAS storage devices 636 and NVMe storage devices 638. Examples of such entries in register set 645 may include a Command Descriptor Block (CDB) entry, a data buffer entry, and a completion status entry for SAS storage devices 636 connected to storage interface 634. Examples of such entries in register set 645 may include a queue structure (e.g. a que structure that includes a submission queue entry and a completion queue entry) for a NVMe storage devices 638 connected to storage interface 634. Register set 645 may be considered an example of a means for storing a Command Descriptor Block (CDB) entry, a data buffer entry, and a completion status entry associated with a SAS command and storing a queue structure associated with a NVMe command.

Data exchanged between a host and data storage devices through HBA 630 may be in the form of SAS data packets or NVMe packets. SAS data packets are directed to SAS packet manager 646, which may perform one or more operations on SAS data packets prior to sending them to their destination, e.g. to a host or to a storage device. For example, SAS packet data may be encoded using ECC encoding prior to being received by HBA 630 and SAS packet manager 646 may parse the SAS packet and perform ECC decoding of data to detect and correct any errors (i.e. error correction of SAS packets). A corrected copy of the data may then be sent to the destination. NVMe data packets are directed to NVMe packet manager 648, which may perform one or more operations on NVMe packets prior to sending them to their destination, e.g. to a host or to a storage device. For example, NVMe packet data may be encoded using ECC encoding prior to being received by HBA 630 and NVMe packet manager 648 may parse the NVMe packet and perform ECC decoding of data to detect and correct any errors (i.e. error correction of NVMe packets). A corrected copy of the data may then be sent to the destination.

When an HBA is initialized, e.g. during a power up routine, an initialization process may detect and identify devices attached to the HBA, for example storage devices attached to storage interface 634 of HBA 630. Thus, characteristics of different storage devices connected to ports, such as Mini SAS Connector 1 to Mini SAS Connector 4, may be discovered and may be recorded in HBA 630 (e.g. in address table 644) so that communication with storage devices can be formatted and directed appropriately by HBA 630.

Figure 7:
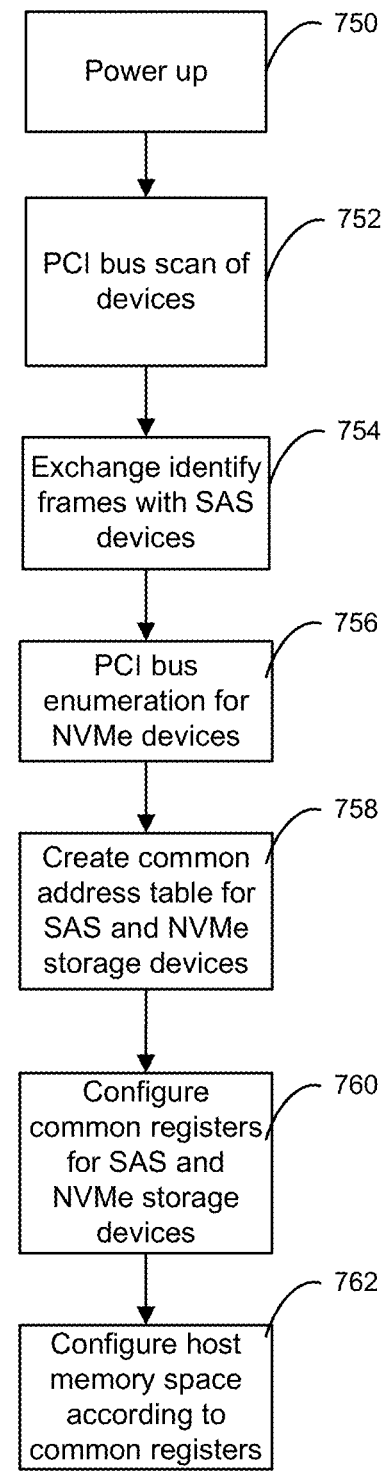
FIG. 7 illustrates an example of an initialization process for an HBA.

FIG. 7 illustrates an example of an initialization process of an HBA such as HBA 630. During power up 750, e.g. during a system boot, a PCI bus scan of devices connected to the HBA is performed 752. This may be part of a scan of all PCI slots of a host, for example. In other cases, an HBA may perform a scan independently. An HBA that has SAS storage devices connected may conduct a hand-shaking routine and exchange identify frames with SAS storage devices 754 to establish which ports have SAS storage devices attached and to obtain basic information about the SAS storage devices. PCI bus enumeration for NVMe devices 756 is performed by attempting to read the vendor register and device ID (VID and DID) register for each combination of bus number and device number to establish a NVMe root complex. Thus, NVMe storage devices are directly discovered by a PCI scan while SAS storage devices are discovered using the HBA to identify any SAS storage devices. A common address table is created for SAS and NVMe storage devices 758. Subsequently, common registers are configured for SAS and NVMe devices 760 and host memory space is configured according to the common registers 762.

Figures 8, 9A:
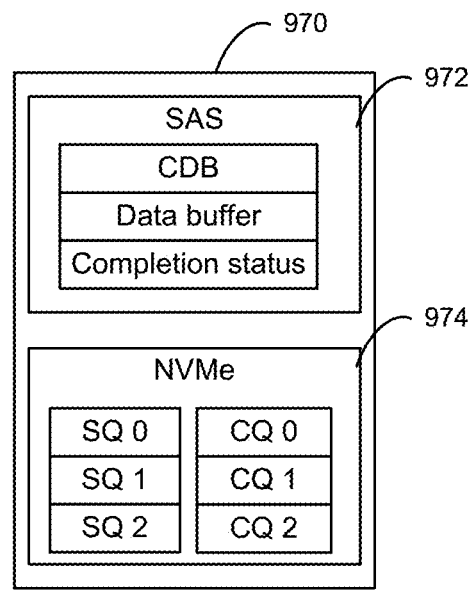
FIG. 8 illustrates an example of a common address table in an HBA.
FIG. 9A illustrates an example of a common register set in an HBA.

A common address table, such as address table 644 may be generated by a process such as the process illustrated in FIG. 7. An example of such a common address table, containing Logical Unit Number (LUN) IDs 0 to 5 for six storage devices attached to a HBA is shown in FIG. 8. LUN IDs 0, 4, and 1 are assigned to SAS storage devices and corresponding addresses of the SAS storage devices are stored in the second column of the table, with the third column recording the ports to which they are connected. Thus, SAS storage device with LUN ID=0 has address 0x5000ccab025413f and is connected to port 17. LUN IDs 2 and 5 are assigned to NVMe storage devices with addresses of the NVMe storage devices in the second column and ports to which the NVMe storage devices are attached listed in the third column. Thus, for example, the NVMe storage device with LUN ID=5 has address: /devices/pci0000:00/0000:00:02.0/0000:07:00.0/0000:08:01.0/0000:0b:00.0/pcifab_bus/pcifa b-1/01:0016/nvme/nvme1/nvme1n1 and is connected to port number 6. LUN ID 3 is assigned to an expander, which may be a SAS expander or an NVMe expander and contains an expander address accordingly (a SAS address or NVMe address according to the type of expander). It will be understood that a SAS or NVMe expander allows a single HBA port to be connected to multiple storage devices. The end devices are not reflected in the table of FIG. 8, which has a single entry for the expander. Configuration of end devices is handled by the expander. A common address table such as shown in FIG. 8 may be updated as storage devices are added and/or removed and thus facilitates flexible configuration. A common address table such as shown in FIG. 8 may be exposed to an application through an HBA driver such as HBA driver 524 in host server 500.

A common set of registers may be maintained in an HBA to facilitate handling of commands directed to SAS storage devices and NVMe storage devices. For example, register set 645 of FIG. 6 may be used for both SAS storage devices 636 and NVMe storage devices 638. Register set 645 may be a single contiguous array of register elements (e.g. volatile memory elements such as SRAM elements) with a single point of access (e.g. one port). FIG. 9A shows an example of a common set of registers, common register set 970, configured to maintain Storage Attached SCSI (SAS) entries 972 for SAS storage devices connected to a storage interface and to maintain Non-Volatile Memory Express (NVMe) entries 974 for NVMe storage devices connected to the storage interface. Common register set 970 may be implemented in an HBA, e.g. as register set 645 in FIG. 6. SAS entries 972 include a Command Descriptor Block (CDB) entry, a data buffer entry, and a completion status entry for a SAS storage device connected to a storage interface. For any given command directed to a SAS storage device, such entries may be generated in common register set 970 to facilitate execution of the command. Common register set 970 includes NVMe entries 974 for commands directed to one or more NVMe storage devices. NVMe entries 974 include a queue structure, which includes submission queue entries, SQ0, SQ1, and SQ2, and completion queue entries CQ0, CQ1, and CQ2. For any given command directed to a NVMe storage device, such queues may be generated in common register set 970 to facilitate execution of the command.

On the host side, an HBA driver, such as HBA driver 542 handles commands directed to both SAS storage devices and NVMe storage devices that are connected to an HBA. Command related information may be exchanged between an HBA and a host using a common address space in the host that is configured to reflect entries in the common registers. The common address space may be configured in volatile memory, such as host Dynamic Random Access Memory (DRAM) and may be configured to store substantially the same information contained in common register set of an HBA, e.g. register set 645 of FIG. 6 or common register set 970 of FIG. 9B.

Figure 9B:
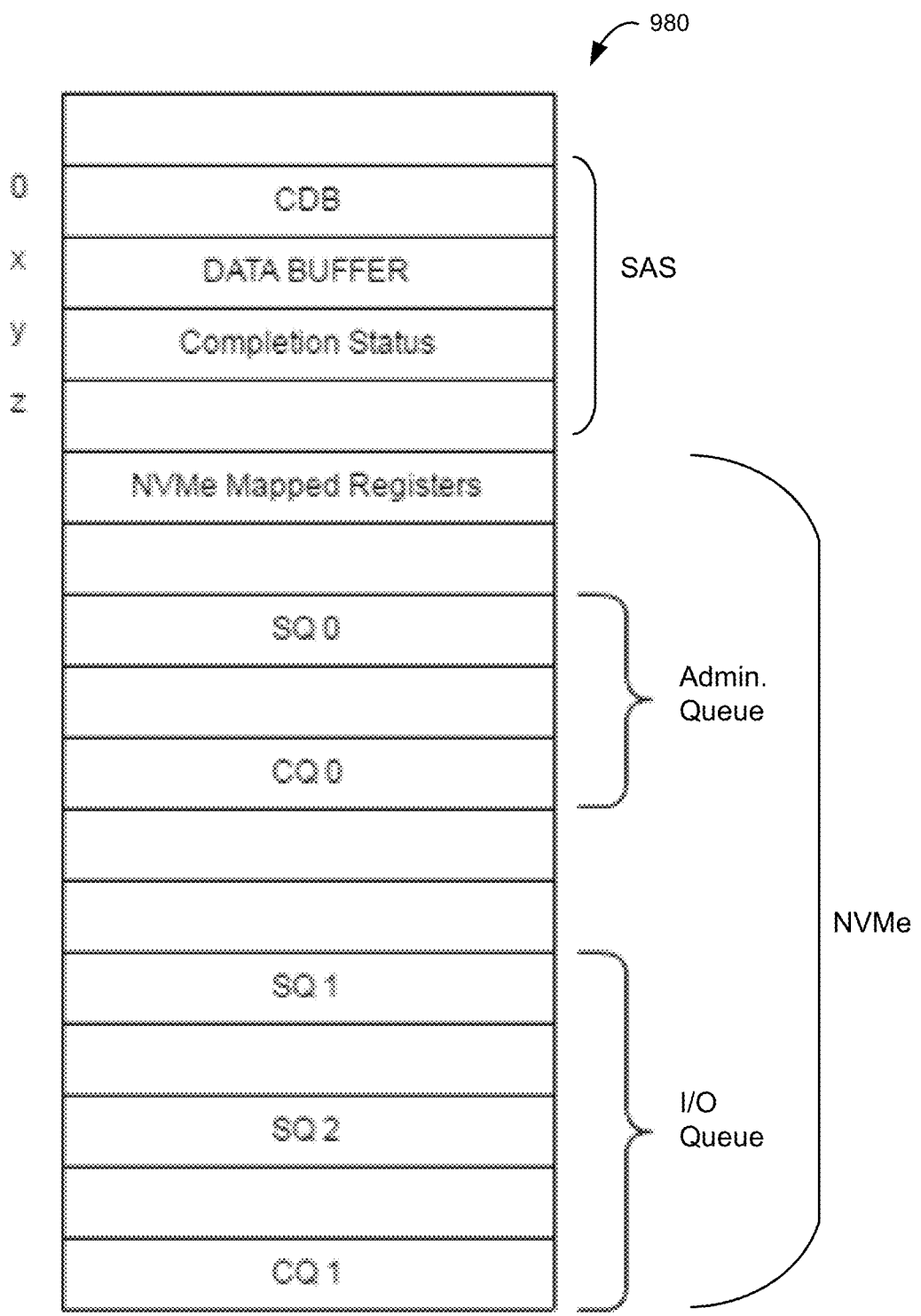
FIG. 9B illustrates an example of a common address space in a host.

FIG. 9B shows an example arrangement of a common address space 980 in a host DRAM that includes entries that are replicated in both host DRAM and in a common register set in an HBA, e.g. common register set 970. When an application sends a command that is directed to a SAS storage device, a memory allocator allocates appropriate buffers in a common address space, e.g. buffers 0, x, y, and z of common address space 980, which may, for example, be respectively allocated to store a Command Descriptor Block (CDB) entry, a data buffer entry (for data being read or written), a completion status entry, and any other entries as shown. When an application sends a command that is directed to an NVMe storage device, a memory allocator allocates space in common address space 980 for a queue structure that includes individual queues as entries. For example, a submission queue entry and a completion queue entry may be allocated for an NVMe command. NVMe queues may be classified as related to administration or Input/Output (I/O). FIG. 9B shows submission queue SQ0 and completion queue CQ0 as administration queue entries ("Admin. Queue) and shows submission queue entries SQ1 and SQ2 and completion queue CQ1 as I/O queues ("I/O queue"). Separating queues into administration and I/O queues may allow prioritization in some cases, e.g. prioritizing I/O commands to avoid delay due to administration commands which can be executed as background operations during idle time. Common address space 980 may be populated with entries by the HBA driver operating in the host, working in conjunction with control circuits in the HBA, to copy data from a common set of registers (e.g. register set 645) to common address space 980 in a host volatile memory (e.g. DRAM). The data from the common set of registers may include a Command Descriptor Block (CDB) entry, data buffer entry, completion status entry, submission queue entry, completion queue entry, and any other entries to facilitate command execution.

Figure 10:
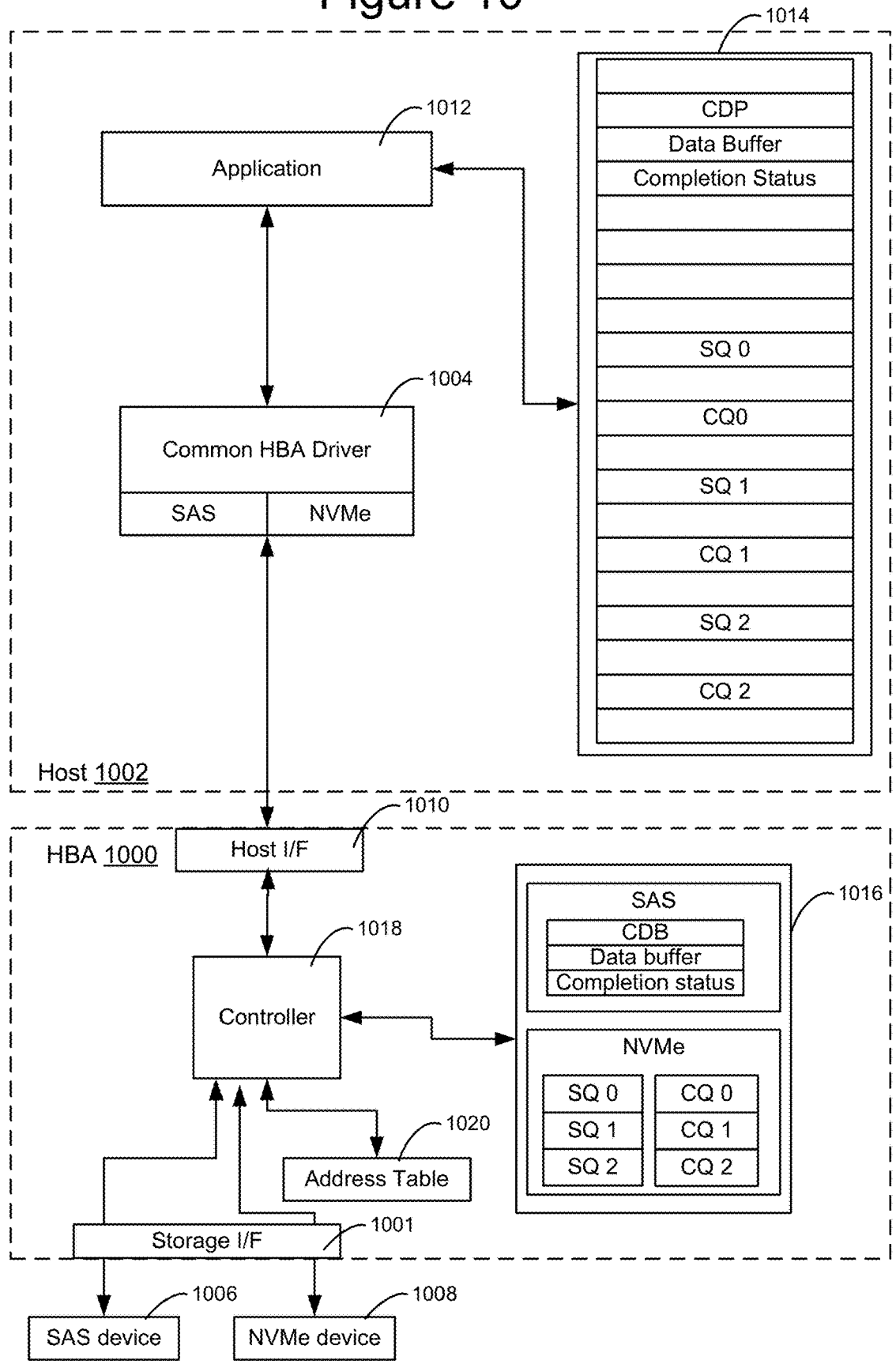
FIG. 10 illustrates an example of an HBA connected to a host.

FIG. 10 illustrates configuration of an HBA 1000 that is configurable for operation with both SAS and NVMe storage devices through storage interface 1001. HBA 1000 is in communication with a host system 1002 that includes a common HBA driver 1004 configured to operate with both SAS storage devices 1006 and NVMe storage devices 1008 attached to HBA 1000. HBA 1000 and host system 1002 may communicate through a host interface 1010 such as a PCI or PCIe interface. An application 1012 in host system 1002 generates commands directed to SAS storage device 1006 and/or NVMe storage device 1008. It will be understood that multiple applications in a host, or remote from the host, may generate multiple commands to storage devices including SAS storage device 1006 and NVMe storage device 1008 that may be facilitated by common HBA driver 1004 and that the number of applications may be more than one. A common address space 1014 in volatile memory (e.g. DRAM) of host system 1002 is configured to hold entries for SAS storage device 1006 and NVMe storage device 1008 (and any other such storage devices attached to HBA 1000). Common address space 1014 may be configured as illustrated in FIG. 9B. Entries in common address space 1014 include CDP, Data Buffer, and Completion Status entries for SAS storage device 1006 and a queue structure for NVMe storage device 1008 that includes submission queues (e.g. SQ0, SQ1, and SQ2) and completion queues (e.g. CQ0, CQ1, and CQ2). Entries in common address space 1014 reflect corresponding entries in common registers 1016 of HBA 1000. Common registers 1016 may be configured as illustrated in FIG. 9A. A controller 1018 in HBA 1000 is coupled to common registers 1016 and may coordinate entries of common registers 1016 and common address space 1014, e.g. controller 1018 may be configured to copy data between the common registers 1016 and common address space 1014 in host volatile memory. The data in the common registers 1016 may include a Command Descriptor Block (CDB) entry, a data buffer entry, a completion status entry, a submission queue entry, and a completion queue entry so that these entries are reproduced in common address space 1014. Control circuits of controller 1018 may perform additional functions including directing communication between host system 1002 and storage devices according to an address table 1020, which may include an entry for SAS storage device 1006 and an entry for NVMe storage device 1008 (e.g. as illustrated in FIG. 8). Address table 1020 may be populated by controller 1018 as part of an initialization process (e.g. a detection circuit in controller 1018 or elsewhere detects SAS storage device 1006 and NVMe storage device 1008 and generates corresponding entries in address table 1020.

Figure 11:
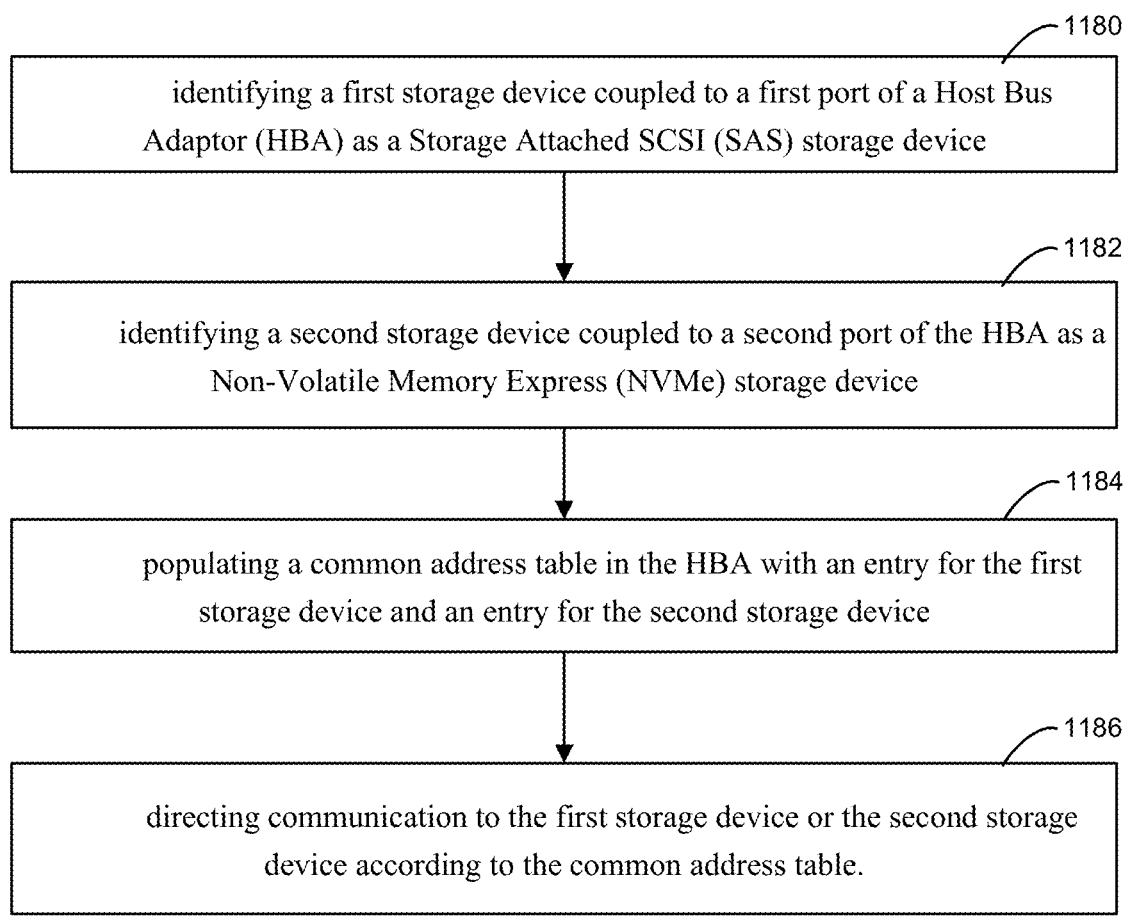
FIG. 11 illustrates an example of a method that includes identifying a SAS storage device and a NVMe storage device.

FIG. 11 shows an example of a method of operation of components illustrated in FIG. 10 according to an example of the present technology. The method includes identifying a first storage device coupled to a first port of a Host Bus Adaptor (HBA) as a Storage Attached SCSI (SAS) storage device 1180, identifying a second storage device coupled to a second port of the HBA as a Non-Volatile Memory Express (NVMe) storage device 1182, populating a common address table in the HBA with an entry for the first storage device and an entry for the second storage device, and directing communication to the first storage device or the second storage device according to the common address table. Thus, for example, controller 1018 and/or common HBA driver 1004 may discover SAS storage device 1006 and NVMe storage device 1008, populate address table 1020 with an entry for SAS storage device 1006 and an entry for NVMe storage device 1008, and direct communication to SAS storage device 1006 and NVMe storage device 1008 according to address table 1020.

Handling of commands by an HBA such as HBA 1000 will now be described for the case of a command directed to a SAS storage device (e.g. SAS storage device 1006) and for the case of a command directed to a NVMe storage device (e.g. NVMe storage device 1008). In particular, use of common components such as a common address table, common registers, and a common host address space allow both types of commands to be handled efficiently without requiring two separate sets of components and provides flexibility in resource allocation between different types of storage devices.

Figure 12A:
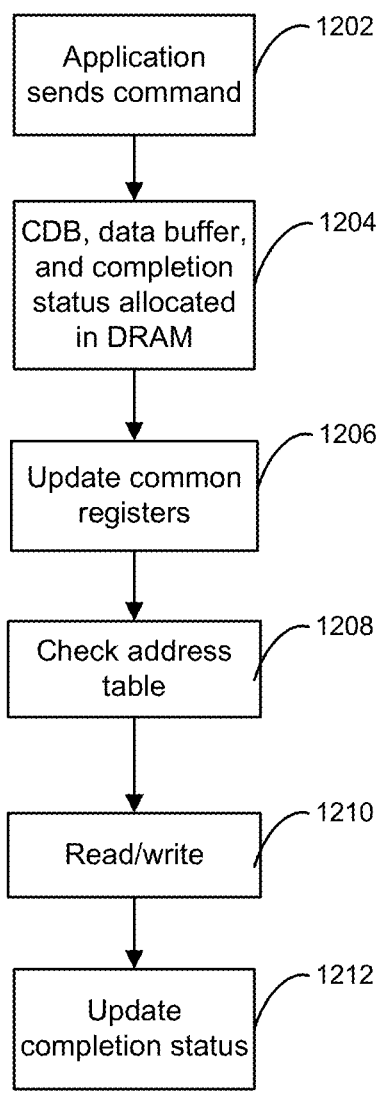
FIGS. 12A-B illustrate examples of command handling in an HBA.

FIG. 12A illustrates an example of handling of a command directed to a SAS storage device such as a command from Application 1012 to SAS storage device 1006 of FIG. 10. An application sends a command 1202, e.g. a read command or write command, and in response, space for CDB, data buffer, and completion status entries are allocated in a common address space in host DRAM 1204, e.g. in common address space 1014. Common registers (e.g. common registers 1016) are updated 1206 according to the entries in host DRAM. For example, the application may call the HBA driver to give the location of the allocated buffers (e.g. a start address) and the HBA driver may then write the contents of the buffers to common registers in the HBA to inform the HBA of the command. The address table (e.g. address table 1020) is checked 1208 to determine which port is connected to the data storage device that is the target of the command and the HBA performs the read or write 1210 by accessing the address provided. The address table may be generated as illustrated in FIG. 11, e.g. during an initialization process. Completion status is then updated 1212, for example, by the HBA controller updating the completion status entry in host DRAM. For a read, the data from the SAS storage device is written to the host DRAM and an interrupt may be generated to cause the host processor to recognize completion and, using an application ID stored with the completion notice, contact the application to inform it that the requested read data is in host DRAM so that the application can consume the data.

Figure 12B:
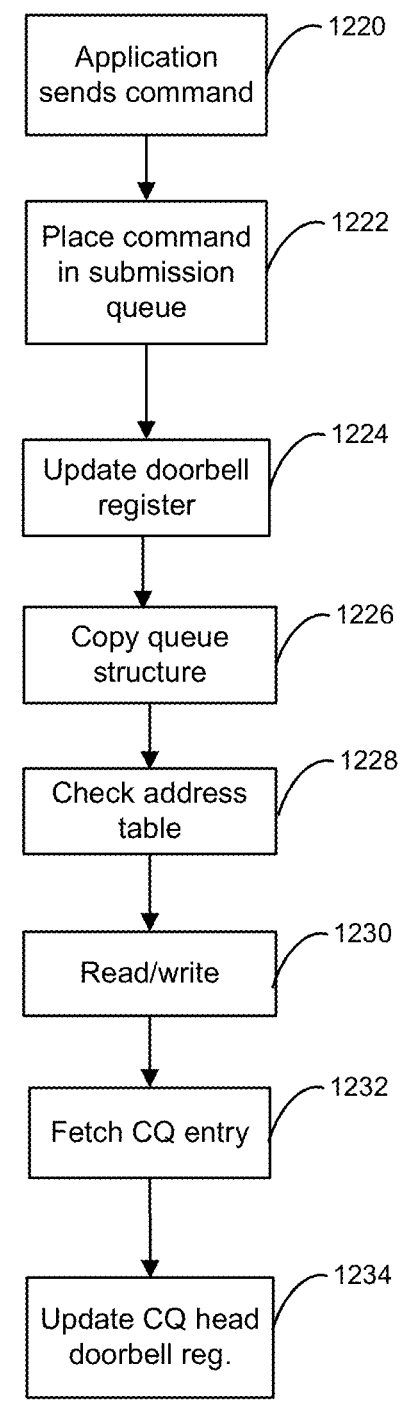

FIG. 12B illustrates an example of handling of a command directed to a NVMe storage device such as a command from Application 1012 to NVMe storage device 1008 of FIG. 10. Thus, in contrast to the example of FIG. 12A, FIG. 12B illustrates steps that handle a command directed to an NVMe storage device and not a SAS storage device. An application sends a command 1220, which is then placed in a submission queue 1222 in common address space in host DRAM, e.g. in common address space 1014. A doorbell register is updated to inform the HBA of the new command. In response, the HBA controller copies the queue structure 1226 from host DRAM to common registers (e.g. common registers 1016) in the HBA and checks the address table (e.g. address table 1020) to determine which port is connected to the NVMe storage device. The address table may be generated as illustrated in FIG. 11, e.g. during an initialization process. The HBA controller then carries out the read or write 1230 by accessing the address provided. For a read command, data read from the SAS storage device is copied to host DRAM and the completion queue (CQ) entries are fetched 1232 by the host. The CQ head doorbell register is updated 1234 to reflect that the entries have been fetched.

Figure 13:
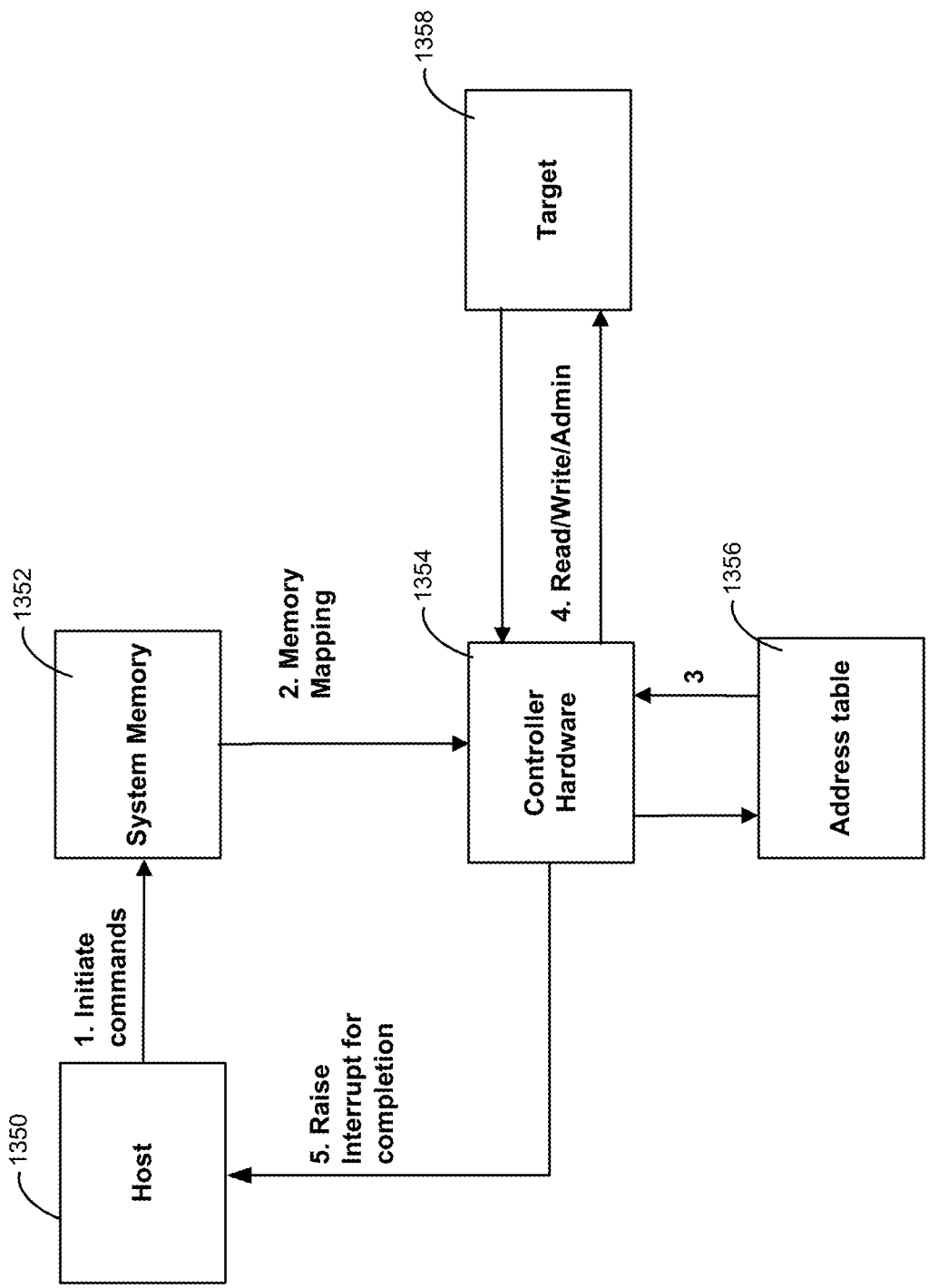
FIG. 13 illustrates command handling.

FIG. 13 illustrates a simplified example of how a host may interact with a target storage device that may be either a SAS storage device or a NVMe storage device using common structures and thus represents common features of the processes illustrated in FIG. 12A with respect to SAS storage devices and in FIG. 12B with respect to NVMe storage devices. In step 1, a host 1350 initiates commands by generating corresponding entries in system memory 1352. In step 2, entries in system memory 1352 are copied to HBA controller hardware 1354, e.g. to a common register set in an HBA. HBA controller hardware 1354 accesses an address table 1356 to identify a target storage device, target 1358, based on an address provided in the command. Target 1358 may be a SAS storage device, a NVMe storage device, or other storage device. In step 4, the command is executed by writing data in target 1358 or reading data from target 1358. Read data may be copied to system memory 1352. Subsequently, in step 5, an interrupt is raised to signal completion of the read or write to host 1350.

An example of a system includes: a host interface, a storage interface, and one or more control circuits coupled to the host interface and coupled to the storage interface, the one or more control circuits including a common set of registers configured to: maintain first entries according to a first storage protocol for first storage devices connected to the storage interface; and maintain second entries according to a second storage protocol for second storage devices connected to the storage interface.

The first storage protocol may be Storage Attached SCSI (SAS); and the second storage protocol may be Non-Volatile Memory Express (NVMe). The storage interface may include a plurality of ports; and an individual port of the plurality of ports is configurable for use with SAS storage devices and for use with NVMe storage devices. The system may include a detection circuit configured to detect connection of a storage device to the individual port; and identify the storage device as either a SAS storage device or a NVMe storage device. The system may include a common address table configured to: maintain entries for one or more SAS storage devices connected to the storage interface; and maintain entries for one or more NVMe storage devices connected to the storage interface. The first storage protocol may be Storage Attached SCSI (SAS) and the common set of registers may include a Command Descriptor Block (CDB) entry, a data buffer entry, and a completion status entry for a SAS storage device connected to the storage interface. The second storage protocol may be Non-Volatile Memory Express (NVMe) and the common set of registers may include a submission queue entry and a completion queue entry for a NVMe storage device connected to the storage interface. The one or more control circuits may be configured for communication through the host interface with a Host Bus Adaptor (HBA) driver operating in a host to copy data from the common set of registers to a common address space in volatile memory of the host, the data from the common set of registers including the CDB entry, the data buffer entry, the completion status entry, the submission queue entry, and the completion queue entry. The system may include a Storage Attached SCSI (SAS) packet manager configured to: receive a SAS data packet; perform error correction on the SAS data packet; and send a corrected copy of the SAS data packet. The system may include a Non-Volatile Memory Express (NVMe) packet manager configured to: receive a NVMe data packet; perform error correction on the NVMe data packet; and send a corrected copy of the NVMe data packet.

An example of a method includes: identifying a first storage device coupled to a first port of a Host Bus Adaptor (HBA) as a Storage Attached SCSI (SAS) storage device; identifying a second storage device coupled to a second port of the HBA as a Non-Volatile Memory Express (NVMe) storage device; populating a common address table in the HBA with an entry for the first storage device and an entry for the second storage device; and directing communication to the first storage device or the second storage device according to the common address table.

The method may include configuring common registers for the SAS storage device and the NVMe storage device. The method may include configuring a common address space in volatile memory of a host according to the common registers. The method may further include populating the common registers with a Command Descriptor Block (CDB) entry, a data buffer entry, and a completion status entry for the SAS storage device, populating the common registers with a submission queue entry and a completion queue entry for the NVMe storage device, and copying contents of the common registers including the CDB entry, the data buffer entry, the completion status entry, the submission queue entry and the completion queue entry between the common registers and the common address space in the host volatile memory. The method may include copying contents of the common registers including the Command Descriptor Block (CDB) entry, the data buffer entry, the completion status entry, the submission queue entry, and the completion queue entry to a common address space in the host. The method may include, in response to receiving a SAS command from an application, copying a Command Descriptor Block (CDB) entry, a data buffer entry, and a completion status entry from the common address space in the host volatile memory to the common registers; identifying the first port coupled to the SAS storage device associated with the SAS command from the common address table; directing the SAS command to the SAS storage device through the first port; and updating the completion status entry in the host volatile memory to indicate completion of the SAS command. The method may further include in response to receiving an NVMe command from an application, copying a queue structure from the common address space in the host volatile memory to the common registers; identifying the second port coupled to the NVMe storage device associated with the NVMe command from the common address table; directing the NVMe command to the NVMe storage device through the second port; and updating the queue structure in the host volatile memory to indicate completion of the NVMe command. The method may further include: directing SAS data packets to a SAS packet manager; performing error correction of SAS data packets in the SAS packet manager; directing NVMe data packets to a NVMe packet manager; and performing error correction of NVMe data packets in the NVMe packet manager.

An example of a system includes: means for communicating with a host system, means for communicating with a plurality of storage devices including Storage Attached SCSI (SAS) devices and Non-Volatile Memory Express (NVMe) devices, means for storing an address table that includes SAS entries for SAS storage devices and NVMe entries for NVMe devices, and means for storing a Command Descriptor Block (CDB) entry, a data buffer entry, and a completion status entry associated with a SAS command and storing a queue structure associated with a NVMe command.

The system may include means for copying the CDB entry, the data buffer entry, the completion status entry, and the queue structure to a common address space of the host system.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A system, comprising:
a host interface including a Peripheral Component Interface express (PCIe) connector configured to couple to a host PCIe connector;
a storage interface; and
one or more control circuits coupled to the host interface and coupled to the storage interface and configured to provide host access through the host PCIe connector to Storage Attached SCSI (SAS) storage devices and to Non-Volatile Memory Express (NVMe) storage devices connected to the storage interface, the one or more control circuits including a common set of registers configured to:
maintain first entries according to SAS storage protocol for the SAS storage devices connected to the storage interface, the first entries including a Command Descriptor Block (CDB) entry, a data buffer entry, and a completion status entry; and
maintain second entries according to a NVMe storage protocol for the NVMe storage devices connected to the storage interface, the second entries including a submission queue entry and a completion queue entry.

2. The system of claim 1 further comprising a common address table with an entry for each SAS storage device and an entry for each NVMe storage device.

3. The system of claim 1 wherein:
the storage interface includes a plurality of ports; and
an individual port of the plurality of ports is configurable for use with SAS storage devices and for use with NVMe storage devices.

4. The system of claim 3 further comprising a detection circuit configured to:
detect connection of a storage device to the individual port; and
identify the storage device as either a SAS storage device or a NVMe storage device.

5. The system of claim 4 further comprising a common address table configured to:
maintain entries for one or more SAS storage devices connected to the storage interface; and
maintain entries for one or more NVMe storage devices connected to the storage interface.

6. The system of claim 5 wherein the one or more control circuits are configured to direct communication to a SAS device or to a NVMe device according to the common address table.

7. The system of claim 1 wherein the PCIe connector is coupled to the host PCIe connector in a host, the host including a HBA driver to access the SAS storage devices and the NVMe storage devices.

8. The system of claim 6 wherein the one or more control circuits are configured for communication through the host interface with a Host Bus Adaptor (HBA) driver operating in a host to copy data from the common set of registers to a common address space in volatile memory of the host, the data from the common set of registers including the CDB entry, the data buffer entry, the completion status entry, the submission queue entry, and the completion queue entry.

9. The system of claim 1 further comprising a Storage Attached SCSI (SAS) packet manager configured to:
receive a SAS data packet;
perform error correction on the SAS data packet; and
send a corrected copy of the SAS data packet.

10. The system of claim 1 further comprising a Non-Volatile Memory Express (NVMe) packet manager configured to:
receive a NVMe data packet;
perform error correction on the NVMe data packet; and
send a corrected copy of the NVMe data packet.

11. A method, comprising:
identifying a first storage device coupled to a first port of a Host Bus Adaptor (HBA) as a Storage Attached SCSI (SAS) storage device;
identifying a second storage device coupled to a second port of the HBA as a Non-Volatile Memory Express (NVMe) storage device;
populating a common address table in the HBA with an entry for the first storage device and an entry for the second storage device;
directing communication to the first storage device or the second storage device according to the common address table;
configuring common registers for the SAS storage device and the NVMe storage device;
populating the common registers with a Command Descriptor Block (CDB) entry, a data buffer entry, and a completion status entry for the SAS storage device; and
populating the common registers with a submission queue entry and a completion queue entry for the NVMe storage device.

12. The method of claim 11 further comprising receiving commands from applications in a host through a common HBA driver that directs commands to SAS and NVMe storage devices.

13. The method of claim 11 further comprising configuring a common address space in volatile memory of a host according to the common registers.

14. The method of claim 13 further comprising:
copying contents of the common registers including the CDB entry, the data buffer entry, the completion status entry, the submission queue entry, and the completion queue entry between the common registers and the common address space in the host volatile memory.

15. The method of claim 14 further comprising configuring the first port as a SAS port and configuring the second port as a NVMe port.

16. The method of claim 13 further comprising:
in response to receiving a SAS command from an application, copying a Command Descriptor Block (CDB) entry, a data buffer entry, and a completion status entry from the common address space in the host volatile memory to the common registers;
identifying the first port coupled to the SAS storage device associated with the SAS command from the common address table;
directing the SAS command to the SAS storage device through the first port; and
updating the completion status entry in the host volatile memory to indicate completion of the SAS command.

17. The method of claim 16 further comprising:
in response to receiving an NVMe command from an application, copying a queue structure from the common address space in the host volatile memory to the common registers;

identifying the second port coupled to the NVMe storage device associated with the NVMe command from the common address table;
directing the NVMe command to the NVMe storage device through the second port; and
updating the queue structure in the host volatile memory to indicate completion of the NVMe command.

18. The method of claim 17 further comprising:
directing SAS data packets to a SAS packet manager;
performing error correction of SAS data packets in the SAS packet manager;
directing NVMe data packets to a NVMe packet manager; and
performing error correction of NVMe data packets in the NVMe packet manager.

19. A system comprising:
means for communicating with a Peripheral Component Interface express (PCIe) connector of a host system;
means for communicating with a plurality of storage devices including Storage Attached SCSI (SAS) devices and Non-Volatile Memory Express (NVMe) devices to provide host access through the host PCIe connector to the SAS storage devices and the NVMe storage devices;
means for storing an address table that includes SAS entries for SAS storage devices and NVMe entries for NVMe devices; and
means for storing a Command Descriptor Block (CDB) entry, a data buffer entry, and a completion status entry associated with a SAS command and storing a queue structure associated with a NVMe command.

20. The system of claim 19 further comprising means for copying the CDB entry, the data buffer entry, the completion status entry, and the queue structure to a common address space of the host system.

* * * * *